United States Patent
Shain (10) Patent No.: US 6,757,703 B2
(45) Date of Patent: Jun. 29, 2004

(54) ASSOCIATIVE PROCESSOR ADDITION AND SUBTRACTION

(75) Inventor: Joseph Shain, Tel Aviv (IL)

(73) Assignee: Neomagic Israel Ltd., Netanya (IL)

( * ) Notice: Subject to any disclaimer, the term of this patent is extended or adjusted under 35 U.S.C. 154(b) by 267 days.

(21) Appl. No.: 10/108,451

(22) Filed: Mar. 29, 2002

(65) Prior Publication Data

US 2003/0187902 A1 Oct. 2, 2003

(51) Int. Cl.[7] .............................................. G06F 7/50
(52) U.S. Cl. ..................................... 708/709; 708/670
(58) Field of Search .................................. 708/709, 670

(56) References Cited

U.S. PATENT DOCUMENTS

| | | | | |
|---|---|---|---|---|
| 3,576,436 A | * | 4/1971 | Lindquist ................... | 708/670 |
| 3,757,312 A | | 9/1973 | Shore et al. | |
| 4,287,566 A | | 9/1981 | Culler | |
| 4,491,932 A | * | 1/1985 | Ruhman et al. ............ | 382/131 |
| 5,805,490 A | * | 9/1998 | Machida .................... | 708/700 |
| 5,943,502 A | | 8/1999 | Sariel et al. | |
| 6,195,738 B1 | | 2/2001 | Akerib | |

OTHER PUBLICATIONS

Sieworek et al: Computer Strutures; Principles and Examples Chapter 21 "A productive implementation of an associative array processor STARAN 19" Mc Graw–Hill New York (1982).

* cited by examiner

*Primary Examiner*—David H. Malzahn
(74) *Attorney, Agent, or Firm*—Mark M. Friedman (57) ABSTRACT

Methods of adding and subtracting sets of binary numbers using an associative processor. The inner loop over corresponding bits of the operands is executed in only three machine cycles. Only the carry bit of each loop iteration is carried forward to the next loop iteration. At most five logical operations are used per loop iteration for addition, and at most seven logical operations, of which at most five are binary logical operations, are used per loop iteration for subtraction. In each loop iteration, the second input bit is a direct or indirect argument of at most three logical operations in addition, and of at most four logical operations in subtraction. Each loop iteration includes at least one OR operation and at most two XOR operations.

35 Claims, 5 Drawing Sheets

ASSOCIATIVE PROCESSOR ADDITION AND SUBTRACTION

FIELD AND BACKGROUND OF THE INVENTION

The present invention relates to associative processors and, more particularly, to a method of adding and subtracting numbers stored in the associative array of an associative processor.

Figure 1:
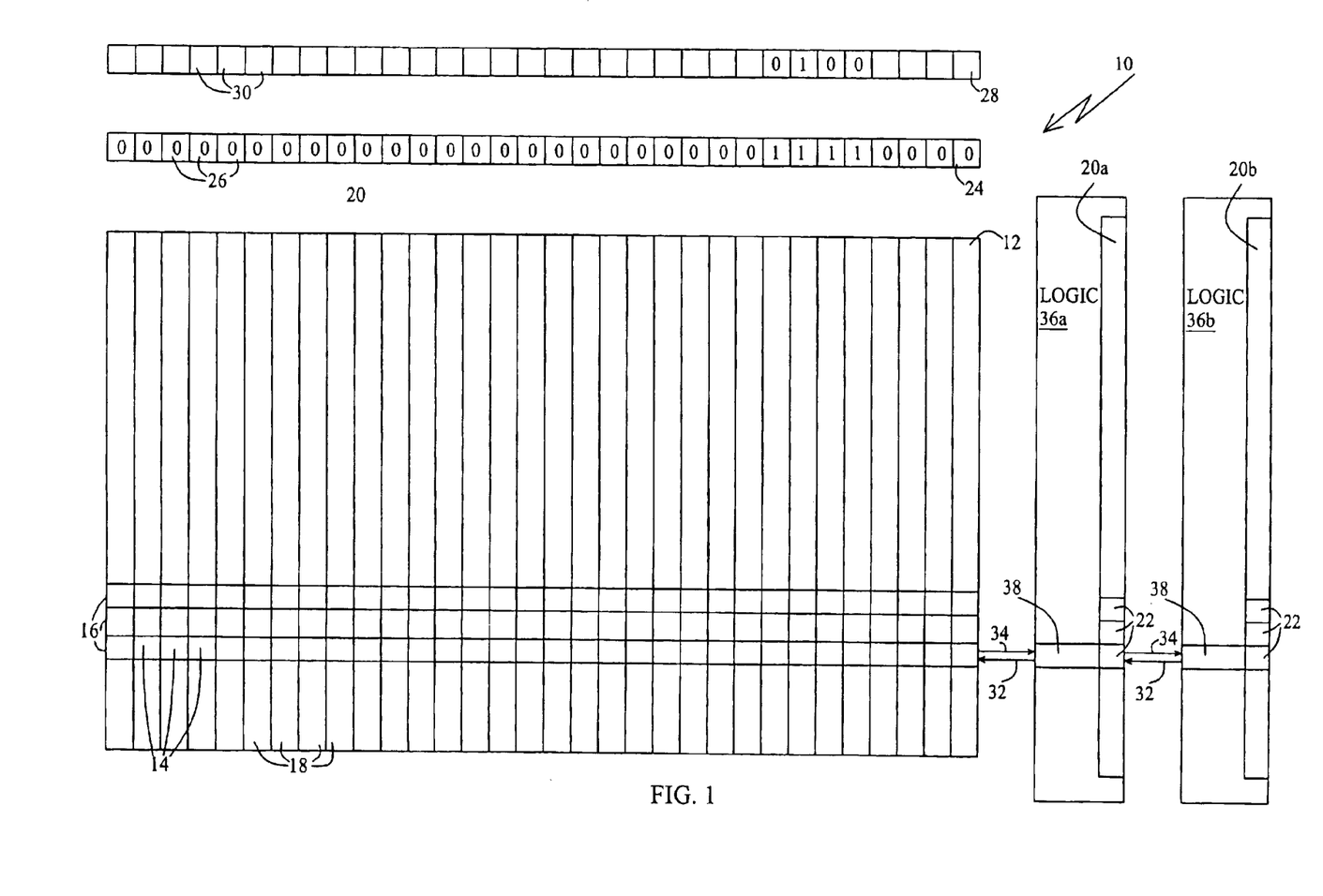
FIG. 1 is a schematic illustration of an associative processor.

An associative processor is a device for parallel processing of a large volume of data. FIG. 1 is a schematic illustration of an associative processor 10. The heart of associative processor 10 is an array 12 of content addressable memory (CAM) cells 14 arranged in rows 16 and columns 18. Associative processor 10 also includes four registers for controlling CAM cells 14: two tags registers 20a and 20b that include many tag register cells 22, a mask register 24 that includes many mask register cells 26, and a pattern register 28 that includes many pattern register cells 30. Each cell 14, 22, 26 or 30 is capable of storing one bit (0 or 1). Each tags register 20 is a part of a tags logic block 36 that communicates with each row 16 via a dedicated word enable line 32 and a dedicated match result line 34, with each tag register cell 22 being associated with a respective row 16 via word enable line 32, match result line 34 and a dedicated logic unit 38. Each mask register cell 26 and each pattern register cell 30 is associated with a respective column 18. For illustrational simplicity, only three rows 16, only one word enable line 32, only one match result line 34 and only two logic units 38 are shown in FIG. 1. Note that the two tag register cells 22 that are associated with the same row 16 share the same word enable line 32 and the same match result line 34. Typical arrays 12 include 8192 ($2^{13}$) rows 16. The array 12 illustrated in FIG. 1 includes 32 columns 18. More typically, array 12 includes 96 or more columns 18.

Each machine cycle of associative processor 10 is either a compare cycle or a write cycle. Correspondingly, in a single machine cycle of associative processor 10, each CAM cell 14 performs one and only one of two kinds of elementary operations, as directed by the contents of the corresponding cells 22, 26 or 30 of registers 20a, 20b, 24 and 28: either a compare operation or a write operation. For both kinds of elementary operations, columns 18 that are to be active are designated by the presence of "1" bits in the associated mask register cells 26. The contents of tag register cells 22 of one of tags logic blocks 36 are broadcast to the associated rows 16 as "write enable" signals by that tags logic block 36 via word enable lines 32, with rows 16 that receive a "1" bit being activated. In a compare cycle, each activated row 16 generates a "1" bit match signal on match result line 34 of that row 16. Each activated CAM cell 14 of that row 16 compares its contents with the contents of the cell 30 of pattern register 28 that is associated with the column 18 of that CAM cell 14. If the two contents are identical (both "0" bits or both "1" bits), that CAM cell 14 allows the match signal to pass. Otherwise, that CAM cell 14 blocks the match signal. As a result, if the contents of all the activated CAM cells 14 of a row 16 match the contents of corresponding cells 30 of pattern register 28, the match signal reaches tags logic blocks 36. In a write cycle, the contents of pattern register cells 30 associated with activated columns 18 are written to the activated CAM cells 14 of those columns 18.

In the example illustrated in FIG. 1, the fifth through eighth columns 18 from the right are activated by the presence of "1" s in the corresponding mask register cells 26. A binary "4" (0100) is stored in the corresponding pattern register cells 30. A compare cycle performed by associative processor 10 in this configuration tests activated rows 16 to see if a binary "4" is stored in their fifth through eighth CAM cells 14 from the right. A write cycle performed by associative processor 10 in this configuration writes binary "4" to the fifth through eighth CAM cells 14 from the right of activated rows 16.

Each logic unit 38 can be configured to perform, in a single machine cycle, one or more of several logical operations (AND, OR, NOT, XOR, identity) whose inputs are one or more of: the bit stored in the associated tag register cell 22, the bit stored in the corresponding tag register cell 22 in the other tags logic block 36, and, if the cycle is a compare cycle, the presence or absence of a match signal on match result line 34. The AND, OR and XOR operations are binary operations (two inputs). The NOT and identity operations are unary operations (one input). The presence of a match signal on match result line 34 is treated as a binary "1". The absence of a match signal on match result line 34 is treated as a binary "0". The result of the logical operation is a single bit that is stored in the associated tag register cell 22. In the simplest set of logical operations, in a compare cycle, the only input is the presence or absence of a match signal on match result line 34 and the sole logical operation is an identity operation. The result of this operation is the writing to the associated tag register cell 22 of the bit corresponding to the presence or absence of a match signal on match result line 34.

In summary, in both kinds of elementary operations, tags register 20a or 20b and mask register 24 provide activation signals and pattern register 28 provides reference bits. Then, in a compare cycle, array 12 provides input to compare with the reference bits and tags registers 20a and 20b receive output; and in a write cycle, array 12 receives output that is identical to one or more reference bits.

Tags logic blocks 36a and 36b also can broadcast "1" s to all rows 16, to activate all rows 16 regardless of the contents of tags registers 20.

An additional function of tags registers 20 is to provide communication between rows 16. For example, suppose that the results of a compare operation executed on rows 16 have been stored in tags register 20a, wherein every bit corresponds to a particular row 16. By shifting tags register 20a, the results of this compare operation are communicated from their source rows 16 to other, target rows 16. In a single tags shift operation the compare result of every source row 16 is communicated to a corresponding target row 16, the distance between any source row 16 and the corresponding target row 16 being the distance of the shift.

More information about associative processors may be found in U.S. Pat. No. 5,974,521, to Akerib, which is incorporated by reference for all purposes as if fully set forth herein.

A prior art method of adding a first set of N binary numbers $\{a_n, n=1 \ldots N\}$, stored in a first set of columns 18, to another set of N binary numbers $\{b_n, n=1 \ldots N\}$, stored in a second set of columns 18, and storing the resulting N binary numbers $\{s_n, n=1 \ldots N\}$ in a third set of columns 18, is taught by Daniel P. Sieworek et al. in Computer Structures: Principles and Examples, Chapter 21: "A productive implementation of an associative array processor: STARAN 319", McGraw-Hill, New York (1982), also available at the URL http://www.ulib.org/webRoot/Books/Saving_Bell_Books/SBN%20Computer%20Strucutres/csp0336.htm.

Without loss of generality, all the input numbers $\{a_n\}$ and $\{b_n\}$ can be assumed to have the same number of bits, because any number that is shorter than the longest input number can be left-padded with "0" bits. For any particular index n, $a_n$ and $b_n$ are initially stored in the same row 16, in different sets of respective columns, and $s_n$ is to be stored in the same row 16, typically in its own set of columns, although either $a_n$ or $b_n$ can be partly or completely overwritten with $s_n$ because once a bit of $s_n$ is computed, the bits of $a_n$ and $b_n$ that contributed to that bit of $s_n$ are no longer needed.

Figure 2:
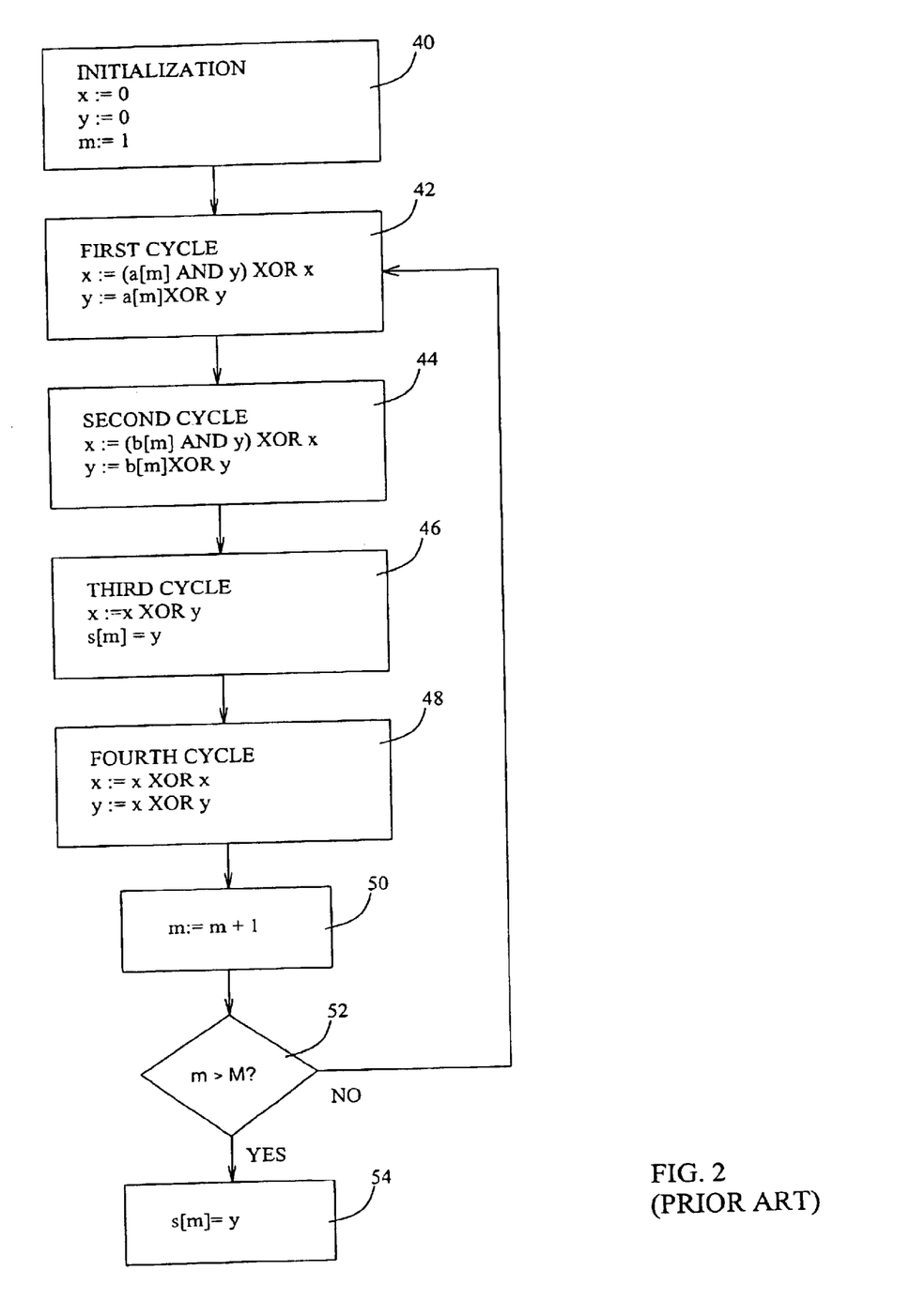
FIG. 2 is a flow chart of a prior art addition algorithm.

FIG. 2 is a flow chart of the algorithm of Sieworek et al. The input numbers are assumed to be M bits long. The m-th bit of a number a, b or s is designated by a[m], b[m] or s[m]. "x" refers to a bit stored in the tag register cell 22 of tags register 20a that is associated with the row 16 that stores the numbers a, b and s. "y" refers to a bit stored in the tag register cell 22 of tags register 20b that is associated with the row 16 that stores the numbers a, b and s. The symbol ":=" means "replacement", as in ALGOL. At each stage of the loop over the bit index m, the carry bits are stored in tags register 20b.

The activities of array processor 10 in each of the blocks of FIG. 2 now will be described in detail.

In the initialization step (block 40), all tag register cells 22 are set to zero, for example by all logic units 38 performing the logical operation XOR with both inputs being whatever bits are initially in tag register cells 22. In addition, all pattern register cells 30 are set to "1".

The first machine cycle in the loop over m (block 42) is a compare cycle. All mask register cells 26 are set to "0" except for the mask register cell 26 corresponding to the column 18 that stores bits a[m]. One of tags logic blocks 36 broadcasts "1" s to all rows 16. The resulting match signals indicate whether the respective bits a[m] are "0" or "1". Each logic unit 38 of tags logic block 36a performs an AND operation whose two inputs are the bit corresponding to the match signal received via match result line 34 and the bit previously stored in the corresponding tag register cell 22 of tags register 20b. Each logic unit 38 of tags logic block 36a then performs an XOR operation whose two inputs are the result of the AND operation and the bit previously stored in the associated tag register cell 22 of tags register 20a. The result of this XOR operation is stored in the associated tag register cell 22 of tags register 20a. Meanwhile, each logic unit 38 of tags logic block 36b performs an XOR operation whose two inputs are the bit corresponding to the match signal received via match result line 34 and the bit previously stored in the associated tag register cell 22 of tags register 20b. The result of this XOR operation is stored in the associated tag register cell 22 of tags register 20b.

The second machine cycle in the loop over m (block 44) is a compare cycle. All mask register cells 26 are set to "0" except for the mask register cell 26 corresponding to the column 18 that stores bits b[m]. One of tags logic blocks 36 broadcasts "1" s to all rows 16. The resulting match signals indicate whether the respective bits b[m] are "0" or "1". Each logic unit 38 of tags logic block 36a performs an AND operation whose two inputs are the bit corresponding to the match signal received via match result line 34 and the bit previously stored in the corresponding tag register cell 22 of tags register 20b. Each logic unit 38 of tags logic block 36a then performs an XOR operation whose two inputs are the result of the AND operation and the bit previously stored in the associated tag register cell 22 of tags register 20a. The result of this XOR operation is stored in the associated tag register cell 22 of tags register 20a. Meanwhile, each logic unit 38 of tags logic block 36b performs an XOR operation whose two inputs are the bit corresponding to the match signal received via match result line 34 and the bit previously stored in the associated tag register cell 22 of tags register 20b. The result of this XOR operation is stored in the associated tag register cell 22 of tags register 20b.

The third machine cycle in the loop over m (block 46) is a write cycle. All mask register cells 26 are set to "0" except for the mask register cell 26 corresponding to the column 18 that is to store bits s[m]. Tags logic block 36b broadcasts the contents of tag register cells 22 of tags register 20a to all rows 16, as write enable signals. This results in the contents of tag register cells 22 of tags register 20a being written to the column 18 that is to store bits s[m]. Meanwhile, each logic unit 38 of tags logic block 36a performs an XOR operation whose two inputs are the bit previously stored in the associated tag register cell 22 of tags register 20a and the bit previously stored in the corresponding tag register cell 22 of tags register 20b. The result of this XOR operation is stored in the associated tag register cell 22 of tags register 20a.

The fourth machine cycle in the loop over m (block 48) may be either a compare cycle or a write cycle, because no data are exchanged between array 12 and tags registers 20 in this machine cycle. Each logic unit 38 of tags logic block 36a performs an XOR operation whose two inputs both are the bit previously stored in the associated tag register cell 22 of tags register 20a. The result of this XOR operation is stored in the associated tag register cell 22 of tags register 20a. Meanwhile, each logic unit 38 of tags logic block 36b performs an XOR operation whose two inputs are the bit previously stored in the corresponding tag register cell 22 of tags register 20a and the bit previously stored in the associated tag register cell 22 of tags register 20b. The result of this XOR operation is stored in the associated tag register cell 22 of tags register 20b.

In block 50, the bit index m is incremented. In block 52, m is tested to see if all input bits have been processed. If there are more input bits to process, the algorithm returns to block 42. Otherwise, in block 54, all mask register cells 26 are set to "0" except for the mask register cell 26 corresponding to the column 18 that is to store the final carry bits, bits s[M+1]. Tags logic block 36b broadcasts the contents of tag register cells 22 of tags register 20a to all rows 16, as write enable signals. This results in the contents of tag register cells 22 of tags register 20a being written to the column 18 that is to store bits s[M+1].

Alternatively, if it is known a priori that all numbers $b_n$ are shorter than the longest number of $\{a_n\}$, a simplified version of the algorithm of FIG. 2 can be applied to bits of numbers a for which the bit index m exceeds the number of bits in the longest member of the set of numbers $\{b_n\}$. Specifically, if b[m]=0, then the output of block 44 is identical to the input of block 44, and block 44 can be skipped. In general, the full algorithm of FIG. 2 must be applied only to bits a[m] of the number a that have corresponding bits b[m] in the number b.

SUMMARY OF THE INVENTION

According to the present invention there is provided a method of adding each binary number of a plurality of first binary numbers to a corresponding binary number of a like plurality of second binary numbers, including the steps of: (a) providing an array processor that includes: (i) an array of content addressable memory (CAM) cells, and (ii) a first and second tags register, each tags register including, for each row of the array, a respective tag register cell, each tags register also including, for each row of the array, a respective logic unit operative to perform, within a single machine cycle, at least one logical operation on input including at least two operands selected from the group consisting of: (A) a bit stored in the respective tag register cell of the first tags register immediately prior to the single machine cycle, (B) a bit stored in the respective tag register cell of the second tags register immediately prior to the single machine cycle, and (C) if the single machine cycle is a compare cycle: an output of a compare operation on the each row; (b) storing the plurality of first binary numbers in a respective first at least one column of the array, each first binary number being stored in a respective row of the array; (c) storing the plurality of second binary numbers in a respective second at least one column of the array, each second binary number being stored in the respective row of the corresponding first binary number; and (d) for each row: for each bit of the first binary number, stored in the each row, that has a corresponding bit in the second binary number stored in the each row: combining the each bit of the first binary number stored in the each row with the corresponding bit of the second binary number stored in the each row and with a respective carry bit, using the first and second registers and the respective logic units, thereby producing a respective sum bit, all within at most three machine cycles; the combining being effected for all the binary numbers substantially simultaneously.

According to the present invention there is provided a method of adding each binary number of a plurality of first binary numbers to a corresponding binary number of a like plurality of second binary numbers, including the steps of: (a) storing the plurality of first binary numbers in a respective first at least one column of an array of content addressable memory (CAM) cells, each first binary number being stored in a respective row of the array; (b) storing the plurality of second binary numbers in a respective second at least one column of the array, each second binary number being stored in the respective row of the corresponding first binary number, (c) providing, for each row: (i) a first tag register cell, (ii) a second tag register cell, and (iii) for each tag register cell, a respective logic unit operative to perform, within a single machine cycle, at least one logical operation on input including at least two operands selected from the group consisting of a bit from one of the binary numbers stored in the each row, a bit stored in the each tag register cell immediately prior to the single machine cycle and a bit stored in the other tag register cell immediately prior to the single machine cycle; and (d) for each row: for each bit of the first binary number, stored in the each row, that has a corresponding bit in the second binary number stored in the each row: combining the each bit of the first binary number stored in the each row with the corresponding bit of the second binary number stored in the each row and with a respective carry bit, using the first and second registers and the respective logic units, wherein, in a first machine cycle of the combining, the inputs of the logical operations include only the each bit of the first binary number stored in the each row and the respective carry bit.

According to the present invention there is provided a method of adding each binary number of a plurality of first binary numbers to a corresponding binary number of a like plurality of second binary numbers, including the steps of: (a) storing the plurality of first binary numbers in a respective first at least one column of an array of content addressable memory (CAM) cells, each first binary number being stored in a respective row of the array; (b) storing the plurality of second binary numbers in a respective second at least one column of the array, each second binary number being stored in the respective row of the corresponding first binary number, (c) providing, for each row: (i) a first tag register cell, (ii) a second tag register cell, and (iii) for each tag register cell, a respective logic unit operative to perform, within a single machine cycle, at least one logical operation on input including at least two operands selected from the group consisting of a bit from one of the binary numbers stored in the each row, a bit stored in the each tag register cell immediately prior to the single machine cycle and a bit stored in the other tag register cell immediately prior to the single machine cycle; and (d) for each row: for each bit of the first binary number, stored in the each row, that has a corresponding bit in the second binary number stored in the each row: (i) combining the each bit of the first binary number stored in the each row with the corresponding bit of the second binary number stored in the each row and with a respective carry bit, using the first and second registers and the respective logic units, the respective logic units performing at most five logical operations, thereby producing a respective sum bit, and (ii) storing the respective sum bit in one of the CAM cells of the each row.

According to the present invention there is provided a method of adding each binary number of a plurality of first binary numbers to a corresponding binary number of a like plurality of second binary numbers, including the steps of: (a) storing the plurality of first binary numbers in a respective first at least one column of an array of content addressable memory (CAM) cells, each first binary number being stored in a respective row of the array; (b) storing the plurality of second binary numbers in a respective second at least one column of the array, each second binary number being stored in the respective row of the corresponding first binary number, (c) providing, for each row: (i) a first tag register cell, (ii) a second tag register cell, and (iii) for each tag register cell, a respective logic unit operative to perform, within a single machine cycle, at least one logical operation on input including at least two operands selected from the group consisting of a bit from one of the binary numbers stored in the each row, a bit stored in the each tag register cell immediately prior to the single machine cycle and a bit stored in the other tag register cell immediately prior to the single machine cycle; and (d) for each row: for each bit of the first binary number, stored in the each row, that has a corresponding bit in the second binary number stored in the each row: (i) combining the each bit of the first binary number stored in the each row with the corresponding bit of the second binary number stored in the each row and with a respective carry bit, using the first and second registers and the respective logic units, at most three of the logical operations performed by the logic units including the corresponding bit of the second binary number stored in the each row as an input thereof, thereby producing a respective sum bit, and (ii) storing the respective sum bit in one of the CAM cells of the each row.

According to the present invention there is provided a method of adding each binary number of a plurality of first binary numbers to a corresponding binary number of a like plurality of second binary numbers, including the steps of: (a) storing the plurality of first binary numbers in a respective first at least one column of an array of content addressable memory (CAM) cells, each first binary number being stored in a respective row of the array; (b) storing the plurality of second binary numbers in a respective second at least one column of the array, each second binary number being stored in the respective row of the corresponding first binary number, (c) providing, for each row: (i) a first tag register cell, (ii) a second tag register cell, and (iii) for each tag register cell, a respective logic unit operative to perform, within a single machine cycle, at least one logical operation on input including at least two operands selected from the group consisting of a bit from one of the binary numbers stored in the each row, a bit stored in the each tag register cell immediately prior to the single machine cycle and a bit stored in the other tag register cell immediately prior to the single machine cycle; and (d) for each row: for each bit of the first binary number, stored in the each row, that has a corresponding bit in the second binary number stored in the each row: (i) combining the each bit of the first binary number stored in the each row with the corresponding bit of the second binary number stored in the each row and with a respective carry bit, using the first and second registers and the respective logic units, the logical operations performed by the logic units including at least one OR operation, thereby producing a respective sum bit, and (ii) storing the respective sum bit in one of the CAM cells of the each row.

According to the present invention there is provided a method of adding each binary number of a plurality of first binary numbers to a corresponding binary number of a like plurality of second binary numbers, including the steps of: (a) storing the plurality of first binary numbers in a respective first at least one column of an array of content addressable memory (CAM) cells, each first binary number being stored in a respective row of the array; (b) storing the plurality of second binary numbers in a respective second at least one column of the array, each second binary number being stored in the respective row of the corresponding first binary number, (c) providing, for each row: (i) a first tag register cell, (ii) a second tag register cell, and (iii) for each tag register cell, a respective logic unit operative to perform, within a single machine cycle, at least one logical operation on input including at least two operands selected from the group consisting of a bit from one of the binary numbers stored in the each row, a bit stored in the each tag register cell immediately prior to the single machine cycle and a bit stored in the other tag register cell immediately prior to the single machine cycle; and (d) for each row: for each bit of the first binary number, stored in the each row, that has a corresponding bit in the second binary number stored in the each row: (i) combining the each bit of the first binary number stored in the each row with the corresponding bit of the second binary number stored in the each row and with a respective carry bit, using the first and second registers and the respective logic units, the logical operations performed by the logic units including at most two XOR operations, thereby producing a respective sum bit, and (ii) storing the respective sum bit in one of the CAM cells of the each row.

According to the present invention there is provided a method of subtracting each binary number of a plurality of second binary numbers from a corresponding binary number of a like plurality of first binary numbers, including the steps of: (a) providing an array processor that includes: (i) an array of content addressable memory (CAM) cells, and (ii) a first and second tags register, each tags register including, for each row of the array, a respective tag register cell, each tags register also including, for each row of the array, a respective logic unit operative to perform, within a single machine cycle, at least one logical operation on input including at least two operands selected from the group consisting of: (A) a bit stored in the respective tag register cell of the first tags register immediately prior to the single machine cycle, (B) a bit stored in the respective tag register cell of the second tags register immediately prior to the single machine cycle, and (C) if the single machine cycle is a compare cycle: an output of a compare operation on the each row; (b) storing the plurality of first binary numbers in a respective first at least one column of the array, each first binary number being stored in a respective row of the array; (c) storing the plurality of second binary numbers in a respective second at least one column of the array, each second binary number being stored in the respective row of the corresponding first binary number; and (d) for each row: for each bit of the first binary number, stored in the each row, that has a corresponding bit in the second binary number stored in the each row: combining the each bit of the first binary number stored in the each row with the corresponding bit of the second binary number stored in the each row and with a respective carry bit, using the first and second registers and the respective logic units, thereby producing a respective difference bit, all within at most three machine cycles; the combining being effected for all the binary numbers substantially simultaneously.

According to the present invention there is provided a method of subtracting each binary number of a plurality of second binary numbers from a corresponding binary number of a like plurality of first binary numbers, including the steps of: (a) storing the plurality of first binary numbers in a respective first at least one column of an array of content addressable memory (CAM) cells, each first binary number being stored in a respective row of the array; (b) storing the plurality of second binary numbers in a respective second at least one column of the array, each second binary number being stored in the respective row of the corresponding first binary number, (c) providing, for each row: (i) a first tag register cell, (ii) a second tag register cell, and (iii) for each tag register cell, a respective logic unit operative to perform, within a single machine cycle, at least one logical operation on input including at least two operands selected from the group consisting of a bit from one of the binary numbers stored in the each row, a bit stored in the each tag register cell immediately prior to the single machine cycle and a bit stored in the other tag register cell immediately prior to the single machine cycle; and (d) for each row: for each bit of the first binary number, stored in the each row, that has a corresponding bit in the second binary number stored in the each row: combining the each bit of the first binary number stored in the each row with the corresponding bit of the second binary number stored in the each row and with a respective carry bit, using the first and second registers and the respective logic units, wherein, in a first machine cycle of the combining, the inputs of the logical operations include only the each bit of the first binary number stored in the each row and the respective carry bit.

According to the present invention there is provided a method of subtracting each binary number of a plurality of second binary numbers from a corresponding binary number of a like plurality of first binary numbers, including the steps of: (a) storing the plurality of first binary numbers in a respective first at least one column of an array of content addressable memory (CAM) cells, each first binary number being stored in a respective row of the array; (b) storing the plurality of second binary numbers in a respective second at least one column of the array, each second binary number being stored in the respective row of the corresponding first binary number, (c) providing, for each row: (i) a first tag register cell, (ii) a second tag register cell, and (iii) for each tag register cell, a respective logic unit operative to perform, within a single machine cycle, at least one logical operation on input including at least two operands selected from the group consisting of a bit from one of the binary numbers stored in the each row, a bit stored in the each tag register cell immediately prior to the single machine cycle and a bit stored in the other tag register cell immediately prior to the single machine cycle; and (d) for each row: for each bit of the first binary number stored in the each row that has a corresponding bit in the second binary number stored in the each row: (i) combining the each bit of the first binary number stored in the each row with the corresponding bit of the second binary number stored in the each row and with a respective carry bit, using the first and second registers and the respective logic units, the respective logic units performing at most seven logical operations, thereby producing a respective difference bit, and (ii) storing the respective difference bit in one of the CAM cells of the each row.

According to the present invention there is provided a method of subtracting each binary number of a plurality of second binary numbers from a corresponding binary number of a like plurality of first binary numbers, including the steps of: (a) storing the plurality of first binary numbers in a respective first at least one column of an array of content addressable memory (CAM) cells, each first binary number being stored in a respective row of the array; (b) storing the plurality of second binary numbers in a respective second at least one column of the array, each second binary number being stored in the respective row of the corresponding first binary number, (c) providing, for each row: (i) a first tag register cell, (ii) a second tag register cell, and (iii) for each tag register cell, a respective logic unit operative to perform, within a single machine cycle, at least one logical operation on input including at least two operands selected from the group consisting of a bit from one of the binary numbers stored in the each row, a bit stored in the each tag register cell immediately prior to the single machine cycle and a bit stored in the other tag register cell immediately prior to the single machine cycle; and (d) for each row: for each bit of the first binary number, stored in the each row, that has a corresponding bit in the second binary number stored in the each row: (i) combining the each bit of the first binary number stored in the each row with the corresponding bit of the second binary number stored in the each row and with a respective carry bit, using the first and second registers and the respective logic units, at most four of the logical operations performed by the logic units including the corresponding bit of the second binary number stored in the each row as an input thereof, thereby producing a respective difference bit, and (ii) storing the respective difference bit in one of the CAM cells of the each row.

According to the present invention there is provided a method of subtracting each binary number of a plurality of second binary numbers from a corresponding binary number of a like plurality of first binary numbers, including the steps of: (a) storing the plurality of first binary numbers in a respective first at least one column of an array of content addressable memory (CAM) cells, each first binary number being stored in a respective row of the array; (b) storing the plurality of second binary numbers in a respective second at least one column of the array, each second binary number being stored in the respective row of the corresponding first binary number, (c) providing, for each row: (i) a first tag register cell, (ii) a second tag register cell, and (iii) for each tag register cell, a respective logic unit operative to perform, within a single machine cycle, at least one logical operation on input including at least two operands selected from the group consisting of a bit from one of the binary numbers stored in the each row, a bit stored in the each tag register cell immediately prior to the single machine cycle and a bit stored in the other tag register cell immediately prior to the single machine cycle; and (d) for each row: for each bit of the first binary number, stored in the each row, that has a corresponding bit in the second binary number stored in the each row: (i) combining the each bit of the first binary number stored in the each row with the corresponding bit of the second binary number stored in the each row and with a respective carry bit, using the first and second registers and the respective logic units, the logical operations performed by the logic units including at least one OR operation, thereby producing a respective difference bit, and (ii) storing the respective difference bit in one of the CAM cells of the each row.

According to the present invention there is provided a method of subtracting each binary number of a plurality of second binary numbers from a corresponding binary number of a like plurality of first binary numbers, including the steps of: (a) storing the plurality of first binary numbers in a respective first at least one column of an array of content addressable memory (CAM) cells, each first binary number being stored in a respective row of the array; (b) storing the plurality of second binary numbers in a respective second at least one column of the array, each second binary number being stored in the respective row of the corresponding first binary number, (c) providing, for each row: (i) a first tag register cell, (ii) a second tag register cell, and (iii) for each tag register cell, a respective logic unit operative to perform, within a single machine cycle, at least one logical operation on input including at least two operands selected from the group consisting of a bit from one of the binary numbers stored in the each row, a bit stored in the each tag register cell immediately prior to the single machine cycle and a bit stored in the other tag register cell immediately prior to the single machine cycle; and (d) for each row: for each bit of the first binary number, stored in the each row, that has a corresponding bit in the second binary number stored in the each row: (i) combining the each bit of the first binary number stored in the each row with the corresponding bit of the second binary number stored in the each row and with a respective carry bit, using the first and second registers and the respective logic units, the logical operations performed by the logic units including at most two XOR operations, thereby producing a respective difference bit, and (ii) storing the respective difference bit in one of the CAM cells of the each row.

According to the present invention there is provided a method of subtracting each binary number of a plurality of second binary numbers from a corresponding binary number of a like plurality of first binary numbers, including the steps of: (a) storing the plurality of first binary numbers in a respective first at least one column of an array of content addressable memory (CAM) cells, each first binary number being stored in a respective row of the array; (b) storing the plurality of second binary numbers in a respective second at least one column of the array, each second binary number being stored in the respective row of the corresponding first binary number, (c) providing, for each row: (i) a first tag register cell, (ii) a second tag register cell, and (iii) for each tag register cell, a respective logic unit operative to perform, within a single machine cycle, at least one logical operation on input including at least two operands selected from the group consisting of a bit from one of the binary numbers stored in the each row, a bit stored in the each tag register cell immediately prior to the single machine cycle and a bit stored in the other tag register cell immediately prior to the single machine cycle; and (d) for each row: for each bit of the first binary number, stored in the each row, that has a corresponding bit in the second binary number stored in the each row: (i) combining the each bit of the first binary number stored in the each row with the corresponding bit of the second binary number stored in the each row and with a respective carry bit, using the first and second registers and the respective logic units, the logical operations performed by the logic units including at most two XOR operations, thereby producing a respective difference bit, and (ii) storing the respective difference bit in one of the CAM cells of the each row.

Figure 3:
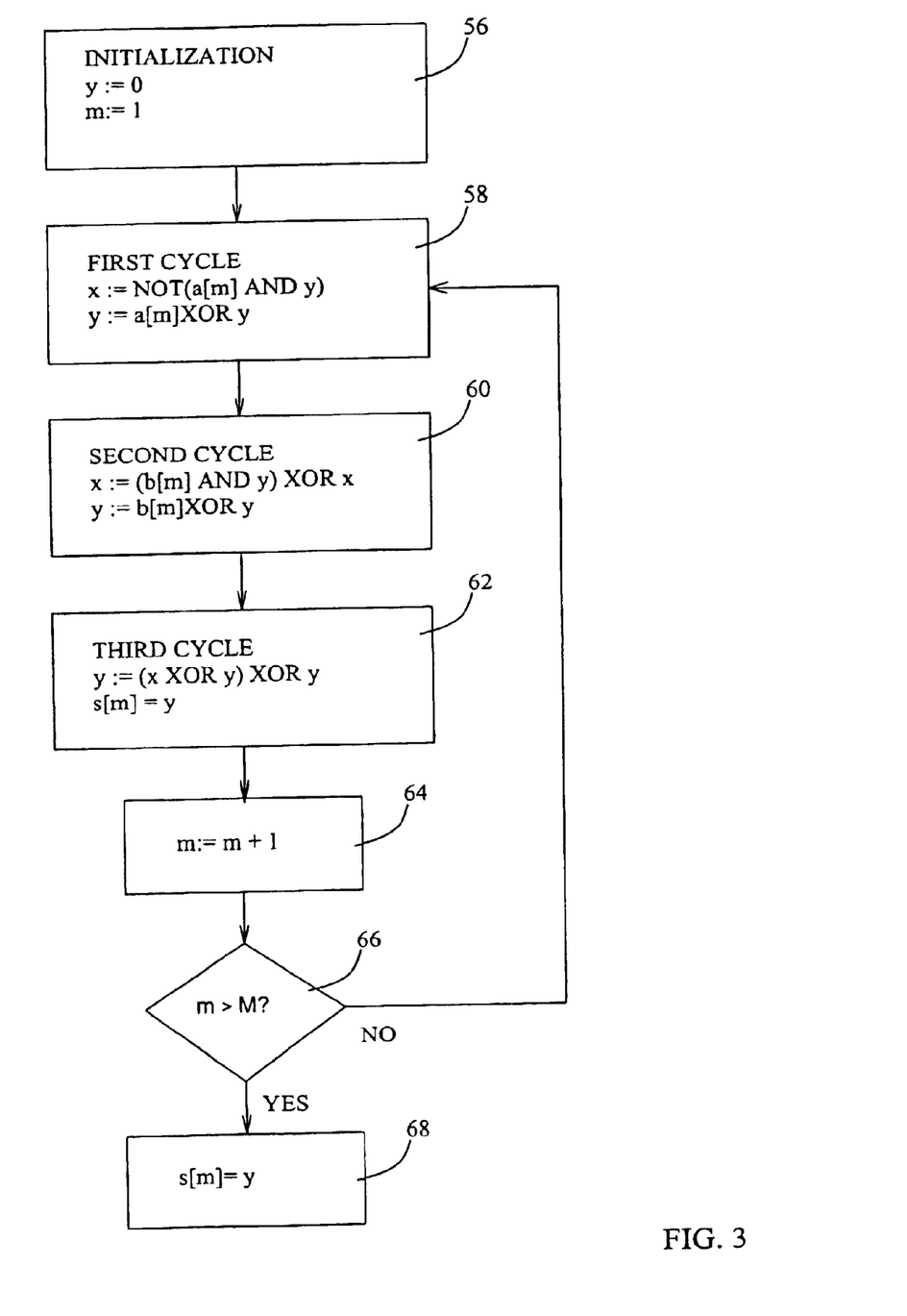
FIG. 3 is a flow chart of a first addition algorithm of the present invention.
Figure 4:
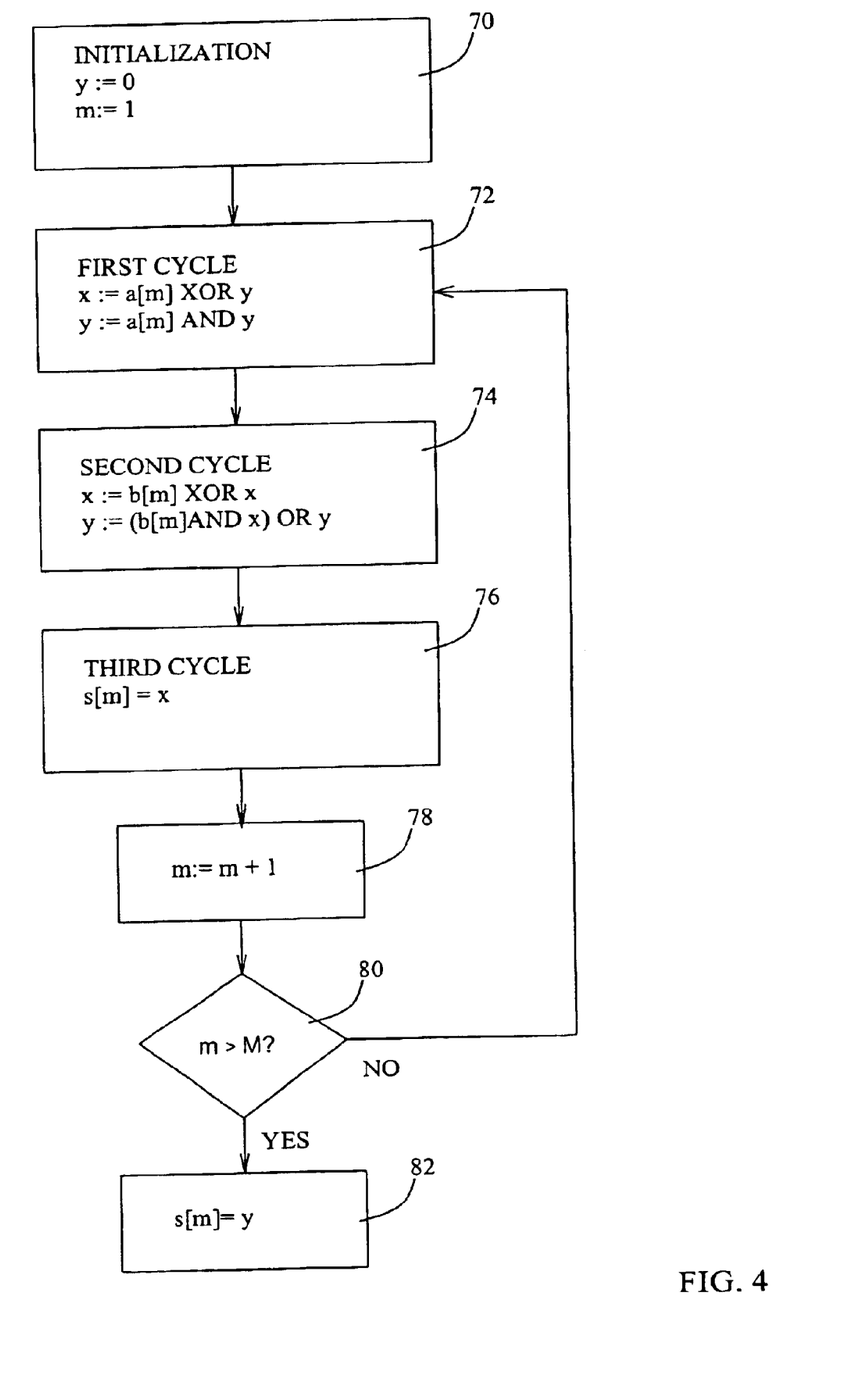
FIG. 4 is a flow chart of a second addition algorithm of the present invention.
Figure 5:
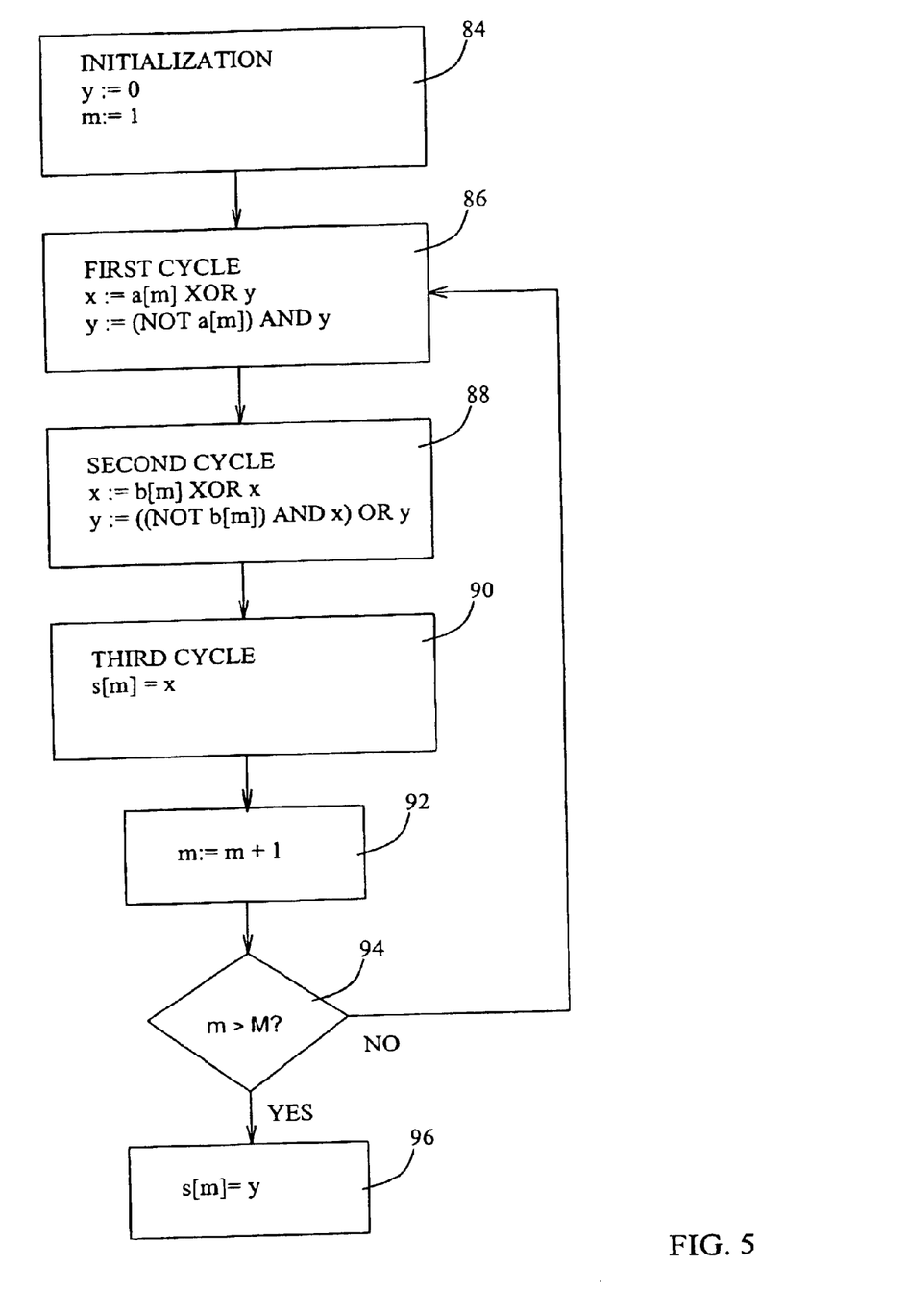
FIG. 5 is a flow chart of a subtraction algorithm of the present invention.

FIG. 3 is a flow chart of a first algorithm of the present invention for adding the N binary numbers $\{a_n\}$ to the N binary numbers $\{b_n\}$. FIG. 4 is a flow chart of a second algorithm of the present invention for adding the N binary numbers $\{a_n\}$ to the N binary numbers $\{b_n\}$. FIG. 5 is a flow chart of an algorithm of the present invention for subtracting the N binary numbers $\{b_n\}$ from the N binary numbers $\{a_n\}$. Initialization blocks 56, 70 and 84 correspond to prior art initialization block 40, except that x is not initialized. Index increment blocks 64, 78 and 92 correspond to prior art increment block 50. Index test blocks 66, 80 and 94 correspond to prior art index test block 52. The storage of the final set of carry bits in blocks 68, 82 and 96 corresponds to prior art block 54. The algorithms of the present invention differ from the prior art algorithm principally in the machine cycle blocks within the loop over the bit index m. These differences are described in detail below. For now, it suffices to make the following observations about the present invention:

1. The algorithms of the present invention include only three machine cycles per pair of input bits: two compare cycles and one write cycle.
2. In the algorithms of the present invention, x is neither initialized before the loop over m nor shared between successive iterations of the loop over m. Only the carry bits (y) are initialized (to "0") before the loop over m and shared between successive iterations of the loop over m.
3. The second addition algorithm of the present invention includes only five logical operations (two ANDs, two XORs, one OR) per pair of input bits, vs. nine logical operations per pair of input bits in the prior art algorithm. Similarly, the subtraction algorithm of the present invention includes only seven logical operations (two ANDs, two XORs, two NOTs, one OR) per pair of input bits, of which only five are binary logical operations.
4. In the second addition algorithm of the present invention, only three of the logical operations per pair of input bits include b[m] as a direct or indirect argument, vs. six logical operations per pair of input bits in the prior art algorithm. Similarly, in the subtraction algorithm of the present invention, only four of the logical operations per pair of input bits include b[m] as a direct or indirect argument.
5. Both the second addition algorithm of the present invention and the subtraction algorithm of the present invention include OR operations. The prior art algorithm lacks OR operations.
6. In both the second addition algorithm of the present invention and the subtraction algorithm of the present invention, there are only two XOR operations per pair of input bits, vs. seven XOR operations in the prior art algorithm.
7. In both the second addition algorithm of the present invention and the subtraction algorithm of the present invention, only one of the logic units performs XOR operations. It follows that, for example, in associative processor 10, logic units 38 of only one of tags logic blocks 36 need to be configured to do XOR operations. This leads to a simplification of associative processor 10, because the hardware needed to perform an XOR operation is more complicated than the hardware needed to perform the other logical operations.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of algorithms for addition and subtraction using an associative processor.

The principles and operation of associative processor arithmetic according to the present invention may be better understood with reference to the drawings and the accompanying description.

The algorithm of FIG. 3 is a simplification of the prior art algorithm of FIG. 2, based on the observation that the "x:=x XOR x" step in block 48 always sets x equal to "0". Therefore, there is no need to initialize x or to carry x between successive iterations of the loop over m.

Referring again to the drawings, the activities of array processor 10 in blocks 58, 60 and 62 of FIG. 3 now will be described in detail.

Block 58 is a compare cycle. All mask register cells 26 are set to "0" except for the mask register cell 26 corresponding to the column 18 that stores bits a[m]. One of tags logic blocks 36 broadcasts "1"s to all rows 16. The resulting match signals indicate whether the respective bits a[m] are "0" or "1". Each logic unit 38 of tags logic block 36a performs an AND operation whose two inputs are the bit corresponding to the match signal received via match result line 34 and the bit previously stored in the corresponding tag register cell 22 of tags register 20b. Each logic unit 38 of tags logic block 36a then performs a NOT operation whose input is the result of the AND operation. The result of this NOT operation is stored in the associated tag register cell 22 of tags register 20a. Meanwhile, each logic unit 38 of tags logic block 36b performs an XOR operation whose two inputs are the bit corresponding to the match signal received via match result line 34 and the bit previously stored in the associated tag register cell 22 of tags register 20b. The result of this XOR operation is stored in the associated tag register cell 22 of tags register 20b.

Block 60 also is a compare cycle. All mask register cells 26 are set to "0" except for the mask register cell 26 corresponding to the column 18 that stores bits b[m]. One of tags logic blocks 36 broadcasts "1" s to all rows 16. The resulting match signals indicate whether the respective bits b[m] are "0" or "1". Each logic unit 38 of tags logic block 36a performs an AND operation whose two inputs are the bit corresponding to the match signal received via match result line 34 and the bit previously stored in the corresponding tag register cell 22 of tags register 20b. Each logic unit 38 of tags logic block 36a then performs an XOR operation whose two inputs are the result of the AND operation and the bit previously stored in the associated tag register cell 22 of tags register 20a. The result of this XOR operation is stored in the associated tag register cell 22 of tags register 20a. Meanwhile, each logic unit 38 of tags logic block 36b performs an XOR operation whose two inputs are the bit corresponding to the match signal received via match result line 34 and the bit previously stored in the associated tag register cell 22 of tags register 20b. The result of this XOR operation is stored in the associated tag register cell 22 of tags register 20b.

Block 62 is a write cycle. All mask register cells 26 are set to "0" except for the mask register cell 26 corresponding to the column 18 that is to store bits s[m]. Tags logic block 36b broadcasts the contents of tag register cells 22 of tags register 20b to all rows 16, as write enable signals. This results in the contents of tag register cells 22 of tags register 20b being written to the column 18 that is to store bits s[m]. Meanwhile, each logic unit 38 of tags logic block 36b performs an XOR operation whose two inputs are the bit previously stored in the associated tag register cell 22 of tags register 20b and the bit previously stored in the corresponding tag register cell 22 of tags register 20a. Each logic unit 38 of tags logic block 36b then performs another XOR operation whose inputs are the result of the first XOR operation and the bit previously stored in the associated tag register cell 22 of tags register 20b. The result of the second XOR operation is stored in the associated tag register cell 22 of tags register 20b.

As in the case of the prior art algorithm of FIG. 2, block 60 can be skipped for the bits of numbers a for which the bit index m exceeds the number of bits in the longest member of the set of numbers $\{b_n\}$. In general, the full algorithm of FIG. 3 must be applied only to bits a[m] of the number a that have corresponding bits b[m] in the number b.

Referring now to FIG. 4, the activities of array processor 10 in blocks 72, 74 and 76 now will be described in detail.

Block 72 is a compare cycle. All mask register cells 26 are set to "0" except for the mask register cell 26 corresponding to the column 18 that stores bits a[m]. One of tags logic blocks 36 broadcasts "1" s to all rows 16. The resulting match signals indicate whether the respective bits a[m] are "0" or "1". Each logic unit 38 of tags logic block 36a performs an XOR operation whose two inputs are the bit corresponding to the match signal received via match result line 34 and the bit previously stored in the corresponding tag register cell 22 of tags register 20b. The result of this XOR operation is stored in the associated tag register cell 22 of tags register 20a. Meanwhile, each logic unit 38 of tags logic block 36b performs an AND operation whose two inputs are the bit corresponding to the match signal received via match result line 34 and the bit previously stored in the associated tag register cell 22 of tags register 20b. The result of this AND operation is stored in the associated tag register cell 22 of tags register 20b.

Block 74 also is a compare cycle. All mask register cells 26 are set to "0" except for the mask register cell 26 corresponding to the column 18 that stores bits b[m]. One of tags logic blocks 36 broadcasts "1"s to all rows 16. The resulting match signals indicate whether the respective bits b[m] are "0" or "1". Each logic unit 38 of tags logic block 36a performs an XOR operation whose two inputs are the bit corresponding to the match signal received via match result line 34 and the bit previously stored in the associated tag register cell 22 of tags register 20a. The result of this XOR operation is stored in the associated tag register cell 22 of tags register 20a. Meanwhile, each logic unit 38 of tags logic block 36b performs an AND operation whose two inputs are the bit corresponding to the match signal received via match result line 34 and the bit previously stored in the corresponding tag register cell 22 of tags register 20a. Each logic unit 38 of tags logic block 36b then performs an OR operation whose two inputs are the output of the AND operation and the bit previously stored in the associated tag register cell 22 of tags register 20b. The result of this OR operation is stored in the associated tag register cell 22 of tags register 20b.

Block 76 is a write cycle. All mask register cells 26 are set to "0" except for the mask register cell 26 corresponding to the column 18 that is to store bits s[m]. Tags logic block 36a broadcasts the contents of tag register cells 22 of tags register 20a to all rows 16, as write enable signals. This results in the contents of tag register cells 22 of tags register 20a being written to the column 18 that is to store bits s[m].

As in the case of the algorithm of FIG. 3, block 74 can be skipped for the bits of numbers a for which the bit index m exceeds the number of bits in the longest member of the set of numbers $\{b_n\}$. In general, the full algorithm of FIG. 4 must be applied only to bits a[m] of the number a that have corresponding bits b[m] in the number b.

The following is a proof of the correctness of the algorithm of FIG. 4. In this proof, the bit index m is suppressed and "c" denotes the carry bit initially stored in y.

At the end of the second machine cycle, x is to be the sum of a, b and c, which is a XOR b XOR c.

$$x = (c \text{ XOR } a) \text{XOR } b = c \text{ XOR } a \text{ XOR } b = a \text{ XOR } b \text{ XOR } c$$

At the end of the second machine cycle, y is to be the carry bit of a+b+c. This is (a AND c) OR (b AND c) OR (a AND b).

$$y = (a \text{ AND } c)\text{OR}[(a \text{ XOR } c)\text{AND } b]$$

$$= (a \text{ AND } c)\text{OR}[((\text{NOT } a)\text{AND } c)\text{OR}(a \text{ AND}(\text{NOT } c))\text{AND } b]$$

$$= (a \text{ AND } c)\text{OR}((\text{NOT } a)\text{AND } b \text{ AND } c)\text{OR}(a \text{ AND } b \text{ AND}(\text{NOT } c))$$

$$= [a \text{ AND}(c \text{ OR}(b \text{ AND}(\text{NOT } c))]\text{OR}((\text{NOT } a)\text{AND } b \text{ AND } c)$$

$$= [a \text{ AND}(c \text{ OR } b)]\text{OR}((\text{NOT } a)\text{AND } b \text{ AND } c)$$

$$= (a \text{ AND } c)\text{OR}(a \text{ AND } b)\text{OR}((\text{NOT } a)\text{AND } b \text{ AND } c)$$

$$= [c \text{ AND}(a \text{ OR}((\text{NOT } a)\text{AND } b))]\text{OR}(a \text{ AND } b)$$

$$= [c \text{ AND}(a \text{ OR } b)]\text{OR}(a \text{ AND } b)$$

$$= (a \text{ AND } c)\text{OR}(b \text{ AND } c)\text{OR}(a \text{ AND } b)$$

Q.E.D.

Referring now to FIG. 5, the activities of array processor 10 in blocks 86, 88 and 90 now will be described in detail.

Block 86 is a compare cycle. All mask register cells 26 are set to "0" except for the mask register cell 26 corresponding to the column 18 that stores bits a[m]. One of tags logic blocks 36 broadcasts "1" s to all rows 16. The resulting match signals indicate whether the respective bits a[m] are "0" or "1". Each logic unit 38 of tags logic block 36a performs an XOR operation whose two inputs are the bit corresponding to the match signal received via match result line 34 and the bit previously stored in the corresponding tag register cell 22 of tags register 20b. The result of this XOR operation is stored in the associated tag register cell 22 of tags register 20a. Meanwhile, each logic unit 38 of tags logic block 36b performs a NOT operation whose input is the bit corresponding to the match signal received via match result line 34. Each logic unit 38 of tags logic block 36b then performs an AND operation whose two inputs are the output of the NOT operation and the bit previously stored in the associated tag register cell 22 of tags register 20b. The result of this AND operation is stored in the associated tag register cell 22 of tags register 20b.

Block 88 also is a compare cycle. All mask register cells 26 are set to "0" except for the mask register cell 26 corresponding to the column 18 that stores bits b[m]. One of tags logic blocks 36 broadcasts "1" s to all rows 16. The resulting match signals indicate whether the respective bits b[m] are "0" or "1". Each logic unit 38 of tags logic block 36a performs an XOR operation whose two inputs are the bit corresponding to the match signal received via match result line 34 and the bit previously stored in the associated tag register cell 22 of tags register 20a. The result of this XOR operation is stored in the associated tag register cell 22 of tags register 20a. Meanwhile, each logic unit 38 of tags logic block 36b performs a NOT operation whose input is the bit corresponding to the match signal received via match result line 34. Each logic unit 38 of tags logic block 36b then performs an AND operation whose two inputs are the result of the NOT operation and the bit previously stored in the corresponding tag register cell 22 of tags register 20a. Each logic unit 38 of tags logic block 36b then performs an OR operation whose two inputs are the output of the AND operation and the bit previously stored in the associated tag register cell 22 of tags register 20b. The result of this OR operation is stored in the associated tag register cell 22 of tags register 20b.

Block 90 is a write cycle. All mask register cells 26 are set to "0" except for the mask register cell 26 corresponding to the column 18 that is to store bits s[m]. Tags logic block 36a broadcasts the contents of tag register cells 22 of tags register 20a to all rows 16, as write enable signals. This results in the contents of tag register cells 22 of tags register 20a being written to the column 18 that is to store bits s[m].

For the bits of numbers a for which the bit index m exceeds the number of bits in the longest member of the set of numbers {$b_n$}, the algorithm of FIG. 5 can be shortened from three machine cycles to two machine cycles, but not by merely skipping block 88. Even though the first step of block 88 reproduces x exactly when b[m]=0, the second step of block 88 does not reproduce y exactly. The output of the second step of block 88 is:

$$((\text{NOT } 0) \text{ AND } x) \text{ OR } y = (1 \text{ AND } x) \text{ OR } y$$

$$= x \text{ OR } y$$

Instead of skipping block 88, block 90 is skipped; and block 88 is changed from a compare cycle to a write cycle, in which tags register 20a performs the write operations that write the contents of tag register cells 22 of tags register 20a to the column 18 that is to store bits s[m], and tags register 20b performs the second step of block 88.

The following is a proof of the correctness of the algorithm of FIG. 5. As in the proof of the correctness of the algorithm of FIG. 4, the bit index m is suppressed and "c" denotes the carry bit initially stored in y.

At the end of the second machine cycle, x is to be the difference of sum of a and b with a carry bit c, which is a XOR b XOR c.

$$x = (c \text{ XOR } a) \text{ XOR } b = c \text{ XOR } a \text{ XOR } b = a \text{ XOR } b \text{ XOR } c$$

At the end of the second machine cycle, y is to be the carry bit of a-b. This is ( (NOT a) AND c) OR (b AND c) OR ( (NOT a) AND b).

$$y = (c \text{ AND}(\text{NOT } a)) \text{ OR}[(\text{NOT}(a \text{ XOR } c)) \text{ AND } b]$$

$$= (c \text{ AND}(\text{NOT } a)) \text{ OR}$$

$$[[\text{NOT}((\text{NOT } a) \text{ AND } c) \text{ OR}(a \text{ AND}(\text{NOT } c))] \text{ AND } b]$$

$$= (c \text{ AND}(\text{NOT } a)) \text{ OR}$$

$$[[\text{NOT}((\text{NOT } a) \text{ AND } c) \text{ AND}(\text{NOT}(a \text{ AND}(\text{NOT } c)))] \text{ AND } b]$$

$$= (c \text{ AND}(\text{NOT } a)) \text{ OR}$$

$$[[(a \text{ OR}(\text{NOT } c)) \text{ AND}(\text{NOT } a \text{ OR } c)] \text{ AND } b]$$

$$= (c \text{ AND}(\text{NOT } a)) \text{ OR}$$

$$[[((\text{NOT } a) \text{ AND}(\text{NOT } c)) \text{ OR}(a \text{ AND } c)] \text{ AND } b]$$

$$= (c \text{ AND}(\text{NOT } a)) \text{ OR}((\text{NOT } a) \text{ AND } b \text{ AND}(\text{NOT } c))$$

$$\text{OR}(a \text{ AND } b \text{ AND } c)$$

$$= [(\text{NOT } a) \text{ AND}(c \text{ OR}(b \text{ AND}(\text{NOT } c)))] \text{ OR}(a \text{ AND } b \text{ AND } c)$$

$$= [(\text{NOT } a) \text{ AND}(c \text{ OR } b)] \text{ OR}(a \text{ AND } b \text{ AND } c)$$

$$= ((\text{NOT } a) \text{ AND } c) \text{ OR}((\text{NOT } a) \text{ AND } b) \text{ OR}(a \text{ AND } b \text{ AND } c)$$

$$= [c \text{ AND}((\text{NOT } a) \text{ OR}(a \text{ AND } b))] \text{ OR}((\text{NOT } a) \text{ AND } b)$$

$$= [c \text{ AND}((\text{NOT } a) \text{ OR } b)] \text{ OR}((\text{NOT } a) \text{ AND } b)$$

$$= ((\text{NOT } a) \text{ AND } c) \text{ OR}(b \text{ AND } c) \text{ OR}((\text{NOT } a) \text{ AND } b)$$

Q.E.D

In addition to adding and subtracting binary numbers stored in different sets of columns 18, the present invention also can be used to add and subtract binary numbers stored in the same set of columns 18. For example, suppose that binary numbers {$a_n$, n=1 . . . N} are stored in a set of columns 18 and it is desired to add the first N−d numbers to the numbers d rows 16 below them, i.e., to compute {$a_n$+ $a_{n+d}$} for n=1 through N−d. Either the algorithm of FIG. 3 or the algorithm of FIG. 4 can be used for this purpose, with tags registers 20 shifted down by d bits at the end of the first machine cycle so that, for any first input bit $a_n$[m], the second input bit is $a_{n+d}$[m]; and with tags register 20b shifted up by as many bits at the end of the second machine cycle as are needed to put the sum bits in the desired rows 16.

While the invention has been described with respect to a limited number of embodiments, it will be appreciated that many variations, modifications and other applications of the invention may be made.

What is claimed is:

1. A method of adding each binary number of a plurality of first binary numbers to a corresponding binary number of a like plurality of second binary numbers, comprising the steps of:

(a) providing an array processor that includes:
   (i) an array of content addressable memory (CAM) cells, and
   (ii) a first and second tags register, each said tags register including, for each row of said array, a respective tag register cell, each said tags register also including, for each row of said array, a respective logic unit operative to perform, within a single machine cycle, at least one logical operation on input including at least two operands selected from the group consisting of:
      (A) a bit stored in said respective tag register cell of said first tags register immediately prior to said single machine cycle,
      (B) a bit stored in said respective tag register cell of said second tags register immediately prior to said single machine cycle, and
      (C) if said single machine cycle is a compare cycle: an output of a compare operation on said each row;
(b) storing the plurality of first binary numbers in a respective first at least one column of said array, each first binary number being stored in a respective row of said array;
(c) storing the plurality of second binary numbers in a respective second at least one column of said array, each second binary number being stored in said respective row of the corresponding first binary number; and
(d) for each said row: for each bit of the first binary number, stored in said each row, that has a corresponding bit in the second binary number stored in said each row: combining said each bit of the first binary number stored in said each row with said corresponding bit of the second binary number stored in said each row and with a respective carry bit, using said first and second registers and said respective logic units, thereby producing a respective sum bit, all within at most three said machine cycles;
said combining being effected for all said binary numbers substantially simultaneously.

2. The method of claim 1, wherein said at most three machine cycles include exactly two compare cycles.

3. The method of claim 1, wherein said at most three machine cycles include only one write cycle.

4. The method of claim 1, wherein, for each said row: for each said bit of the first binary number, stored in said each row, that has a corresponding bit in the second binary number stored in said each row: said combining includes storing said respective sum bit in one of said CAM cells of said each row, also within said at most three machine cycles.

5. The method of claim 4, wherein said at most three machine cycles include only one write cycle, and wherein said storing of all said respective sum bits is effected within said only one write cycle.

6. The method of claim 1, wherein a first of said at most three machine cycles is a compare cycle, and wherein, for each said row: for each said bit of the first binary number, stored in said each row, that has a corresponding bit in the second binary number stored in said each row: during said first machine cycle:
   (i) said logic unit of said first tag register cell:
      (A) effects a first XOR operation whose inputs are:
         (I) an output of a first compare operation, on said each row, that represents said each bit of the first binary number stored in said each row, and
         (II) said bit stored in said second tag register cell immediately prior to said first machine cycle, and
      (B) stores a result of said first XOR operation in said first tag register cell; and
   (ii) said logic unit of said second tag register cell:
      (A) effects a first AND operation whose inputs are:
         (I) said output of said first compare operation, on said each row, that represents said each bit of the first binary number stored in said each row, and
         (II) said bit stored in said second tag register cell immediately prior to said first machine cycle, and
      (B) stores a result of said first AND operation in said second tag register cell.

7. The method of claim 6, wherein a second of said at most three machine cycles is a compare cycle, and wherein, for each said row: for each said bit of the first binary number, stored in said each row, that has a corresponding bit in the second binary number stored in said each row: during said second machine cycle:
   (i) said logic unit of said first tag register cell:
      (A) effects a second XOR operation whose inputs are:
         (I) an output of a second compare operation, on said each row, that represents said corresponding bit of the second binary number stored in said each row, and
         (II) said bit stored in said first tag register cell immediately prior to said second machine cycle, and
      (B) stores a result of said second XOR operation in said first tag register cell; and
   (ii) said logic unit of said second tag register cell:
      (A) effects a second AND operation whose inputs are:
         (I) said output of said second compare operation, on said each row, that represents said corresponding bit of the second binary number stored in said each row, and
         (II) said bit stored in said first tag register cell immediately prior to said second machine cycle,
      (B) effects an OR operation whose inputs are a result of said second AND operation and said bit stored in said second tag register cell immediately prior to said second machine cycle, and
      (C) stores a result of said OR operation in said second tag register cell.

8. The method of claim 1, wherein a first of said at most three machine cycles is a compare cycle, and wherein, for each said row: for each said bit of the first binary number, stored in said each row, that has a corresponding bit in the second binary number stored in said each row: during said first machine cycle:
   (i) said logic unit of said first tag register cell:
      (A) effects a first AND operation whose inputs are:
         (I) an output of a first compare operation, on said each row, that represents said each bit of the first binary number stored in said each row, and
         (II) said bit stored in said second tag register cell immediately prior to said first machine cycle,
      (B) effects a NOT operation whose input is a result of said first AND operation, and
      (C) stores a result of said NOT operation in said first tag register cell; and
   (ii) said logic unit of said second tag register cell:
      (A) effects a first XOR operation whose inputs are:
         (I) said output of said first compare operation, on said each row, that represents said each bit of the first binary number stored in said each row, and:
         (II) said bit stored in said second tag register cell immediately prior to said first machine cycle, and (B) stores a result of said first XOR operation in said second tag register cell.

9. The method of claim 8, wherein a second of said at most three machine cycles is a compare cycle, and wherein, for each said row: for each said bit of the first binary number, stored in said each row, that has a corresponding bit in the second binary number stored in said each row: during said second machine cycle:
   (i) said logic unit of said first tag register cell:
      (A) effects a second AND operation whose inputs are:
         (I) an output of a second compare operation, on said each row, that represents said corresponding bit of the second binary number stored in said each row, and
         (II) said bit stored in said second tag register cell immediately prior to said second machine cycle,
      (B) effects a second XOR operation whose inputs are a result of said second AND operation and said bit stored in said first tag register cell immediately prior to said second machine cycle, and
      (C) stores a result of said second XOR operation in said first tag register cell; and
   (ii) said logic unit of said second tag register cell:
      (A) effects a third XOR operation whose inputs are:
         (I) said output of said second compare operation, on said each row, that represents said corresponding bit of the second binary number stored in said each row, and
         (II) said bit stored in said second tag register cell immediately prior to said second machine cycle, and
      (B) stores a result of said third XOR operation in said second tag register cell.

10. The method of claim 9, wherein a third of said at most three machine cycles is a write cycle, and wherein, for each said row: for each said bit of the first binary number, stored in said each row, that has a corresponding bit in the second binary number stored in said each row: during said third machine cycle, said logic unit of said second tag register cell:
   (i) effects a fourth XOR operation whose inputs are said bits stored in said first and second tag register cells immediately prior to said third machine cycle;
   (ii) effects a fifth XOR operation whose inputs are a result of said fourth XOR operation and said bit stored in said second tag register cell immediately prior to said third machine cycle, and
   (iii) stores a result of said fifth XOR operation in said second tag register cell.

11. A method of adding each binary number of a plurality of first binary numbers to a corresponding binary number of a like plurality of second binary numbers, comprising the steps of:
   (a) storing the plurality of first binary numbers in a respective first at least one column of an array of content addressable memory (CAM) cells, each first binary number being stored in a respective row of said array;
   (b) storing the plurality of second binary numbers in a respective second at least one column of said array, each second binary number being stored in said respective row of the corresponding first binary number,
   (c) providing, for each said row:
      (i) a first tag register cell,
      (ii) a second tag register cell, and
      (iii) for each said tag register cell, a respective logic unit operative to perform, within a single machine cycle, at least one logical operation on input including at least two operands selected from the group consisting of a bit from one of the binary numbers stored in said each row, a bit stored in said each tag register cell immediately prior to said single machine cycle and a bit stored in said other tag register cell immediately prior to said single machine cycle; and
   (d) for each said row: for each bit of the first binary number, stored in said each row, that has a corresponding bit in the second binary number stored in said each row: combining said each bit of the first binary number stored in said each row with said corresponding bit of the second binary number stored in said each row and with a respective carry bit, using said first and second registers and said respective logic units, wherein, in a first machine cycle of said combining, said inputs of said logical operations include only said each bit of the first binary number stored in said each row and said respective carry bit.

12. A method of adding each binary number of a plurality of first binary numbers to a corresponding binary number of a like plurality of second binary numbers, comprising the steps of:
   (a) storing the plurality of first binary numbers in a respective first at least one column of an array of content addressable memory (CAM) cells, each first binary number being stored in a respective row of said array;
   (b) storing the plurality of second binary numbers in a respective second at least one column of said array, each second binary number being stored in said respective row of the corresponding first binary number,
   (c) providing, for each said row:
      (i) a first tag register cell,
      (ii) a second tag register cell, and
      (iii) for each said tag register cell, a respective logic unit operative to perform, within a single machine cycle, at least one logical operation on input including at least two operands selected from the group consisting of a bit from one of the binary numbers stored in said each row, a bit stored in said each tag register cell immediately prior to said single machine cycle and a bit stored in said other tag register cell immediately prior to said single machine cycle; and
   (d) for each said row: for each bit of the first binary number, stored in said each row, that has a corresponding bit in the second binary number stored in said each row:
      (i) combining said each bit of the first binary number stored in said each row with said corresponding bit of the second binary number stored in said each row and with a respective carry bit, using said first and second registers and said respective logic units, said respective logic units performing at most five said logical operations, thereby producing a respective sum bit, and
      (ii) storing said respective sum bit in one of said CAM cells of said each row.

13. The method of claim 12, wherein, for each said row: for each bit of the first binary number, stored in said each row, that has a corresponding bit in the second binary number stored in said each row: at most three of said at most five logical operations include said corresponding bit of the second binary number stored in said each row as an input thereof.

14. The method of claim 12, wherein, for each said row: for each bit of the first binary number, stored in said each row, that has a corresponding bit in the binary number stored in said each row: at least one of said logical operations is an OR operation.

15. The method of claim 12, wherein, for each said row: for each bit of the first binary number, stored in said each row, that has a corresponding bit in the second binary number stored in said each row: at most two of said logical operations are XOR operations.

16. A method of adding each binary number of a plurality of first binary numbers to a corresponding binary number of a like plurality of second binary numbers, comprising the steps of:
(a) storing the plurality of first binary numbers in a respective first at least one column of an array of content addressable memory (CAM) cells, each first binary number being stored in a respective row of said array;
(b) storing the plurality of second binary numbers in a respective second at least one column of said array, each second binary number being stored in said respective row of the corresponding first binary number,
(c) providing, for each said row:
  (i) a first tag register cell,
  (ii) a second tag register cell, and
  (iii) for each said tag register cell, a respective logic unit operative to perform, within a single machine cycle, at least one logical operation on input including at least two operands selected from the group consisting of a bit from one of the binary numbers stored in said each row, a bit stored in said each tag register cell immediately prior to said single machine cycle and a bit stored in said other tag register cell immediately prior to said single machine cycle; and
(d) for each said row: for each bit of the first binary number, stored in said each row, that has a corresponding bit in the second binary number stored in said each row:
  (i) combining said each bit of the first binary number stored in said each row with said corresponding bit of the second binary number stored in said each row and with a respective carry bit, using said first and second registers and said respective logic units, at most three of said logical operations performed by said logic units including said corresponding bit of the second binary number stored in said each row as an input thereof, thereby producing a respective sum bit, and
  (ii) storing said respective sum bit in one of said CAM cells of said each row.

17. A method of adding each binary number of a plurality of first binary numbers to a corresponding binary number of a like plurality of second binary numbers, comprising the steps of:
(a) storing the plurality of first binary numbers in a respective first at least one column of an array of content addressable memory (CAM) cells, each first binary number being stored in a respective row of said array;
(b) storing the plurality of second binary numbers in a respective second at least one column of said array, each second binary number being stored in said respective row of the corresponding first binary number,
(c) providing, for each said row:
  (i) a first tag register cell,
  (ii) a second tag register cell, and
  (iii) for each said tag register cell, a respective logic unit operative to perform, within a single machine cycle, at least one logical operation on input including at least two operands selected from the group consisting of a bit from one of the binary numbers stored in said each row, a bit stored in said each tag register cell immediately prior to said single machine cycle and a bit stored in said other tag register cell immediately prior to said single machine cycle; and
(d) for each said row: for each bit of the first binary number, stored in said each row, that has a corresponding bit in the second binary number stored in said each row:
  (i) combining said each bit of the first binary number stored in said each row with said corresponding bit of the second binary number stored in said each row and with a respective carry bit, using said first and second registers and said respective logic units, said logical operations performed by said logic units including at least one OR operation, thereby producing a respective sum bit, and
  (ii) storing said respective sum bit in one of said CAM cells of said each row.

18. A method of adding each binary number of a plurality of first binary numbers to a corresponding binary number of a like plurality of second binary numbers, comprising the steps of:
(a) storing the plurality of first binary numbers in a respective first at least one column of an array of content addressable memory (CAM) cells, each first binary number being stored in a respective row of said array;
(b) storing the plurality of second binary numbers in a respective second at least one column of said array, each second binary number being stored in said respective row of the corresponding first binary number,
(c) providing, for each said row:
  (i) a first tag register cell,
  (ii) a second tag register cell, and
  (iii) for each said tag register cell, a respective logic unit operative to perform, within a single machine cycle, at least one logical operation on input including at least two operands selected from the group consisting of a bit from one of the binary numbers stored in said each row, a bit stored in said each tag register cell immediately prior to said single machine cycle and a bit stored in said other tag register cell immediately prior to said single machine cycle; and
(d) for each said row: for each bit of the first binary number, stored in said each row, that has a corresponding bit in the second binary number stored in said each row:
  (i) combining said each bit of the first binary number stored in said each row with said corresponding bit of the second binary number stored in said each row and with a respective carry bit, using said first and second registers and said respective logic units, said logical operations performed by said logic units including at most two XOR operations, thereby producing a respective sum bit, and
  (ii) storing said respective sum bit in one of said CAM cells of said each row.

19. A method of subtracting each binary number of a plurality of second binary numbers from a corresponding binary number of a like plurality of first binary numbers, comprising the steps of:
(a) providing an array processor that includes:
  (i) an array of content addressable memory (CAM) cells, and (ii) a first and second tags register, each said tags register including, for each row of said array, a respective tag register cell, each said tags register also including, for each row of said array, a respective logic unit operative to perform, within a single machine cycle, at least one logical operation on input including at least two operands selected from the group consisting of:
  (A) a bit stored in said respective tag register cell of said first tags register immediately prior to said single machine cycle,
  (B) a bit stored in said respective tag register cell of said second tags register immediately prior to said single machine cycle, and
  (C) if said single machine cycle is a compare cycle: an output of a compare operation on said each row;
(b) storing the plurality of first binary numbers in a respective first at least one column of said array, each first binary number being stored in a respective row of said array;
(c) storing the plurality of second binary numbers in a respective second at least one column of said array, each second binary number being stored in said respective row of the corresponding first binary number; and
(d) for each said row: for each bit of the first binary number, stored in said each row, that has a corresponding bit in the second binary number stored in said each row: combining said each bit of the first binary number stored in said each row with said corresponding bit of the second binary number stored in said each row and with a respective carry bit, using said first and second registers and said respective logic units, thereby producing a respective difference bit, all within at most three said machine cycles;
said combining being effected for all said binary numbers substantially simultaneously.

20. The method of claim 19, wherein said at most three machine cycles include exactly two compare cycles.

21. The method of claim 19, wherein said at most three machine cycles include only one write cycle.

22. The method of claim 19, wherein, for each said row: for each said bit of the first binary number, stored in said each row, that has a corresponding bit in the first binary number stored in said each row: said combining includes storing said respective difference bit in one of said CAM cells of said each row, also within said at most three machine cycles.

23. The method of claim 22, wherein said at most three machine cycles include only one write cycle, and wherein said storing of all said respective difference bits is effected within said only one write cycle.

24. The method of claim 19, wherein a first of said at most three machine cycles is a compare cycle, and wherein, for each said row: for each said bit of the first binary number, stored in said each row, that has a corresponding bit in the second binary number stored in said each row: during said first machine cycle:
  (i) said logic unit of said first tag register cell:
    (A) effects a first XOR operation whose inputs are:
      (I) an output of a first compare operation, on said each row, that represents said each bit of the first binary number stored in said each row, and
      (II) said bit stored in said second tag register cell immediately prior to said first machine cycle, and
    (B) stores a result of said first XOR operation in said first tag register cell; and
  (ii) said logic unit of said second tag register cell:
    (A) effects a first NOT operation whose input is said output of said first compare operation, on said each row, that represents said each bit of the first binary number stored in said each row,
    (B) effects a first AND operation whose inputs are a result of said first NOT operation and said bit stored in said second tag register cell immediately prior to said first machine cycle, and
    (C) stores a result of said first AND operation in said second tag register cell.

25. The method of claim 24, wherein a second of said at most three machine cycles in a compare cycle, and wherein, for each said row: for each said bit of the first binary number, stored in said each row, that has a corresponding bit in the second binary number stored in said each row: during said second machine cycle:
  (i) said logic unit of said first tag register cell:
    (A) effects a second XOR operation whose inputs are:
      (I) an output of a second compare operation, on said each row, that represents said corresponding bit of the second binary number stored in said each row, and
      (II) said bit stored in said first tag register cell immediately prior to said second machine cycle, and
    (B) stores a result of said second XOR operation in said first tag register cell; and
  (ii) said logic unit of said second tag register cell:
    (A) effects a second NOT operation whose input is said output of said second compare operation, on said each row, that represents said corresponding bit of the second binary number stored in said each row,
    (B) effects a second AND operation whose inputs are a result of said second NOT operation and said bit stored in said first tag register cell immediately prior to said second machine cycle,
    (C) effects an OR operation whose inputs are a result of said second AND operation and said bit stored in said second tag register cell immediately prior to said second machine cycle, and
    (D) stores a result of said OR operation in said second tag register cell.

26. A method of subtracting each binary number of a plurality of second binary numbers from a corresponding binary number of a like plurality of first binary numbers, comprising the steps of:
  (a) storing the plurality of first binary numbers in a respective first at least one column of an array of content addressable memory (CAM) cells, each first binary number being stored in a respective row of said array;
  (b) storing the plurality of second binary numbers in a respective second at least one column of said array, each second binary number being stored in said respective row of the corresponding first binary number,
  (c) providing, for each said row:
    (i) a first tag register cell,
    (ii) a second tag register cell, and
    (iii) for each said tag register cell, a respective logic unit operative to perform, within a single machine cycle, at least one logical operation on input including at least two operands selected from the group consisting of a bit from one of the binary numbers stored in said each row, a bit stored in said each tag register cell immediately prior to said single machine cycle and a bit stored in said other tag register cell immediately prior to said single machine cycle; and (d) for each said row: for each bit of the first binary number, stored in said each row, that has a corresponding bit in the second binary number stored in said each row: combining said each bit of the first binary number stored in said each row with said corresponding bit of the second binary number stored in said each row and with a respective carry bit, using said first and second registers and said respective logic units, wherein, in a first machine cycle of said combining, said inputs of said logical operations include only said each bit of the first binary number stored in said each row and said respective carry bit.

27. A method of subtracting each binary number of a plurality of second binary numbers from a corresponding binary number of a like plurality of first binary numbers, comprising the steps of:

(a) storing the plurality of first binary numbers in a respective first at least one column of an array of content addressable memory (CAM) cells, each first binary number being stored in a respective row of said array;

(b) storing the plurality of second binary numbers in a respective second at least one column of said array, each second binary number being stored in said respective row of the corresponding first binary number, (c) providing, for each said row:
(i) a first tag register cell,
(ii) a second tag register cell, and
(iii) for each said tag register cell, a respective logic unit operative to perform, within a single machine cycle, at least one logical operation on input including at least two operands selected from the group consisting of a bit from one of the binary numbers stored in said each row, a bit stored in said each tag register cell immediately prior to said single machine cycle and a bit stored in said other tag register cell immediately prior to said single machine cycle; and (d) for each said row: for each bit of the first binary number stored in said each row that has a corresponding bit in the second binary number stored in said each row:
(i) combining said each bit of the first binary number stored in said each row with said corresponding bit of the second binary number stored in said each row and with a respective carry bit, using said first and second registers and said respective logic units, said respective logic units performing at most seven said logical operations, thereby producing a respective difference bit, and
(ii) storing said respective difference bit in one of said CAM cells of said each row.

28. The method of claim 27, wherein, for each said row: for each bit of the first binary number, stored in said each row, that has a corresponding bit in the second binary number stored in said each row: at most four of said at most seven logical operations include said corresponding bit of the second binary number stored in said each row as an input thereof.

29. The method of claim 27, wherein, for each said row: for each bit of the first binary number, stored in said each row, that has a corresponding bit in the second binary number stored in said each row: at least one of said logical operations is an OR operation.

30. The method of claim 27, wherein, for each said row: for each bit of the first binary number, stored in said each row, that has a corresponding bit in the second binary number stored in said each row: at most two of said logical operations are XOR operations.

31. The method of claim 27, wherein, for each said row: for each bit of the first binary number, stored in said each row, that has a corresponding bit in the second binary number stored in said each row: at most five of said seven logical operations are binary operations.

32. A method of subtracting each binary number of a plurality of second binary numbers from a corresponding binary number of a like plurality of first binary numbers, comprising the steps of:

(a) storing the plurality of first binary numbers in a respective first at least one column of an array of content addressable memory (CAM) cells, each first binary number being stored in a respective row of said array;

(b) storing the plurality of second binary numbers in a respective second at least one column of said array, each second binary number being stored in said respective row of the corresponding first binary number, (c) providing, for each said row:
(i) a first tag register cell,
(ii) a second tag register cell, and
(iii) for each said tag register cell, a respective logic unit operative to perform, within a single machine cycle, at least one logical operation on input including at least two operands selected from the group consisting of a bit from one of the binary numbers stored in said each row, a bit stored in said each tag register cell immediately prior to said single machine cycle and a bit stored in said other tag register cell immediately prior to said single machine cycle; and (d) for each said row: for each bit of the first binary number, stored in said each row, that has a corresponding bit in the second binary number stored in said each row:
(i) combining said each bit of the first binary number stored in said each row with said corresponding bit of the second binary number stored in said each row and with a respective carry bit, using said first and second registers and said respective logic units, at most four of said logical operations performed by said logic units including said corresponding bit of the second binary number stored in said each row as an input thereof, thereby producing a respective difference bit, and
(ii) storing said respective difference bit in one of said CAM cells of said each row.

33. A method of subtracting each binary number of a plurality of second binary numbers from a corresponding binary number of a like plurality of first binary numbers, comprising the steps of:

(a) storing the plurality of first binary numbers in a respective first at least one column of an array of content addressable memory (CAM) cells, each first binary number being stored in a respective row of said array;

(b) storing the plurality of second binary numbers in a respective second at least one column of said array, each second binary number being stored in said respective row of the corresponding first binary number, (c) providing, for each said row:
(i) a first tag register cell,
(ii) a second tag register cell, and
(iii) for each said tag register cell, a respective logic unit operative to perform, within a single machine cycle, at least one logical operation on input including at least two operands selected from the group consisting of a bit from one of the binary numbers stored in said each row, a bit stored in said each tag register cell immediately prior to said single machine cycle and a bit stored in said other tag register cell immediately prior to said single machine cycle; and (d) for each said row: for each bit of the first binary number, stored in said each row, that has a corresponding bit in the second binary number stored in said each row:
  (i) combining said each bit of the first binary number stored in said each row with said corresponding bit of the second binary number stored in said each row and with a respective carry bit, using said first and second registers and said respective logic units, said logical operations performed by said logic units including at least one OR operation, thereby producing a respective difference bit, and
  (ii) storing said respective difference bit in one of said CAM cells of said each row.

34. A method of subtracting each binary number of a plurality of second binary numbers from a corresponding binary number of a like plurality of first binary numbers, comprising the steps of:

(a) storing the plurality of first binary numbers in a respective first at least one column of an array of content addressable memory (CAM) cells, each first binary number being stored in a respective row of said array;

(b) storing the plurality of second binary numbers in a respective second at least one column of said array, each second binary number being stored in said respective row of the corresponding first binary number, (c) providing, for each said row:
  (i) a first tag register cell,
  (ii) a second tag register cell, and
  (iii) for each said tag register cell, a respective logic unit operative to perform, within a single machine cycle, at least one logical operation on input including at least two operands selected from the group consisting of a bit from one of the binary numbers stored in said each row, a bit stored in said each tag register cell immediately prior to said single machine cycle and a bit stored in said other tag register cell immediately prior to said single machine cycle; and (d) for each said row: for each bit of the first binary number, stored in said each row, that has a corresponding bit in the second binary number stored in said each row:
  (i) combining said each bit of the first binary number stored in said each row with said corresponding bit of the second binary number stored in said each row and with a respective carry bit, using said first and second registers and said respective logic units, said logical operations performed by said logic units including at most two XOR operations, thereby producing a respective difference bit, and
  (ii) storing said respective difference bit in one of said CAM cells of said each row.

35. A method of subtracting each binary number of a plurality of second binary numbers from a corresponding binary number of a like plurality of first binary numbers, comprising the steps of:

(a) storing the plurality of first binary numbers in a respective first at least one column of an array of content addressable memory (CAM) cells, each first binary number being stored in a respective row of said array;

(b) storing the plurality of second binary numbers in a respective second at least one column of said array, each second binary number being stored in said respective row of the corresponding first binary number, (c) providing, for each said row:
  (i) a first tag register cell,
  (ii) a second tag register cell, and
  (iii) for each said tag register cell, a respective logic unit operative to perform, within a single machine cycle, at least one logical operation on input including at least two operands selected from the group consisting of a bit from one of the binary numbers stored in said each row, a bit stored in said each tag register cell immediately prior to said single machine cycle and a bit stored in said other tag register cell immediately prior to said single machine cycle; and (d) for each said row: for each bit of the first binary number, stored in said each row, that has a corresponding bit in the second binary number stored in said each row:
  (i) combining said each bit of the first binary number stored in said each row with said corresponding bit of the second binary number stored in said each row and with a respective carry bit, using said first and second registers and said respective logic units, said logical operations performed by said logic units including at most two XOR operations, thereby producing a respective difference bit, and
  (ii) storing said respective difference bit in one of said CAM cells of said each row.

* * * * *